United States Patent
Cahill

(10) Patent No.: US 9,975,627 B2
(45) Date of Patent: May 22, 2018

(54) SYSTEMS AND METHODS FOR AIRCRAFT PARKING BRAKES WITH MULTIPLE CONTROL LOCATIONS

(71) Applicant: Goodrich Corporation, Charlotte, NC (US)

(72) Inventor: Eric Cahill, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days. days.

(21) Appl. No.: 15/296,928

(22) Filed: Oct. 18, 2016

(65) Prior Publication Data
US 2018/0105260 A1    Apr. 19, 2018

(51) Int. Cl.
*B64C 25/42*    (2006.01)
*B60T 7/16*    (2006.01)

(52) U.S. Cl.
CPC ............. *B64C 25/42* (2013.01); *B60T 7/16* (2013.01)

(58) Field of Classification Search
CPC ....... B64C 25/42; B64C 25/405; B64C 25/44; B60T 8/1703; B60T 1/065; B60T 7/122; B60Q 1/0011; B60Q 1/488; G08G 5/06; G06F 17/00; G09B 9/16
See application file for complete search history.

(56) References Cited

U.S. PATENT DOCUMENTS

| | | | | |
|---|---|---|---|---|
| 2,516,803 A | * | 7/1950 | Rippere | G09B 9/16 434/53 |
| 3,786,412 A | * | 1/1974 | Capriotti | B60Q 1/488 340/458 |
| 4,681,196 A | * | 7/1987 | Fulmer | B60T 7/122 180/282 |
| 5,046,590 A | * | 9/1991 | Trema | B60T 1/065 188/106 P |
| 5,397,173 A | * | 3/1995 | Bourguet | B60T 8/1703 188/106 P |
| 6,513,885 B1 | * | 2/2003 | Salamat | B60T 8/1703 303/122.09 |

(Continued)

FOREIGN PATENT DOCUMENTS

| | | |
|---|---|---|
| EP | 2982601 | 2/2016 |
| EP | 3056396 | 8/2016 |

(Continued)

OTHER PUBLICATIONS

Partial EP Search Report dated Jan. 18, 2018 in EP Application No. 17197118.7.

*Primary Examiner* — Yuri Kan
(74) *Attorney, Agent, or Firm* — Snell & Wilmer, L.L.P.

(57) ABSTRACT

A system for controlling a parking brake system on an aircraft is provided. The system includes a switch interface comprising an enable switch and an activate switch. The parking brake system is configured to switch the state of a parking brake in response to the enable switch and the activate switch being engaged at the same time. A second switch interface also includes an enable switch and an activate switch with the parking brake system configured to switch the state of the parking brake system in response to the second enable switch and the second activate switch being engaged at the same time. The system may also be controlled from a remote and/or virtual location.

18 Claims, 5 Drawing Sheets

(56) References Cited

U.S. PATENT DOCUMENTS

| | | | | |
|---|---|---|---|---|
| 6,663,271 B1 * | 12/2003 | Giglio | ................. | B60Q 1/0011 |
| | | | | 362/293 |
| 9,387,840 B1 | 7/2016 | Cahill et al. | | |
| 9,417,629 B2 | 8/2016 | Nutaro et al. | | |
| 2005/0189814 A1 * | 9/2005 | Mallevais | ............. | B60T 8/1703 |
| | | | | 303/3 |
| 2009/0014261 A1 * | 1/2009 | Edelson | ................ | B64C 25/405 |
| | | | | 188/156 |
| 2011/0079471 A1 * | 4/2011 | Colin | ....................... | B60T 8/00 |
| | | | | 188/106 P |
| 2012/0006634 A1 | 1/2012 | Bensch et al. | | |
| 2013/0325245 A1 * | 12/2013 | Kolcarek | ................ | G06F 17/00 |
| | | | | 701/29.1 |
| 2016/0009384 A1 | 1/2016 | DiZazzo et al. | | |
| 2016/0124428 A1 | 5/2016 | Nutaro et al. | | |
| 2016/0351061 A1 * | 12/2016 | Lamkin | ................. | G08G 5/065 |

FOREIGN PATENT DOCUMENTS

| | | |
|---|---|---|
| GB | 2450796 | 1/2009 |
| JP | S59160654 | 9/1984 |
| WO | 2012054361 | 4/2012 |

* cited by examiner

SYSTEMS AND METHODS FOR AIRCRAFT PARKING BRAKES WITH MULTIPLE CONTROL LOCATIONS

FIELD

The disclosure relates generally to aircraft parking brakes and, in particular, to parking brake systems and methods with multiple control points.

BACKGROUND

Aircraft parking brakes are typically controlled from a single location. The cockpit, for example, may have a brake handle or latch similar to that of a common car. The parking brake may be disengaged for a variety of reasons. A pilot may disengage the brake to taxi for takeoff or engage the brake to park the aircraft, in which case the cockpit handle may be convenient for the pilot. A ground crew may want to disengage the brake to move the aircraft using a secondary vehicle, in which case getting to the cockpit handle poses an inconvenience. The cockpit-only parking brake controls may thus increase time spent on managing aircraft parking brake systems.

SUMMARY

A system for controlling a parking brake system on an aircraft is provided. The system includes a switch interface comprising an enable switch and an activate switch. The parking brake system is configured to switch the state of a parking brake in response to the enable switch and the activate switch being engaged at the same time. A second switch interface also includes an enable switch and an activate switch with the parking brake system configured to switch the state of the parking brake system in response to the second enable switch and the second activate switch being engaged at the same time.

In various embodiments, the first switch interface may include a light configured to illuminate in response to the first enable switch being engaged. The light may also illuminate in a flashing pattern in response to the state of the parking brake system switching. The second switch interface may also include a light that illuminates in response to the enable switch being engaged. The first switch interface may also have a second light that illuminates in response to the first enable switch being engaged. The first light may illuminate a translucent surface of the first enable switch, and the second light may illuminate a translucent surface of the first activate switch. A virtual machine controller may change the state of the parking brake system. The first light may be configured to illuminate in response to an engage signal transmitted by the VMC, and the VMC may be located remote from the aircraft. A shutoff valve of the parking brake system may be configured to permit hydraulic fluid to pass in response to at least one of the first enable switch or the second enable switch being engaged. A servo of the parking brake system may be in fluid communication with the shutoff valve and configured to change the state of the parking brake system between a park state and a not-park state. The first switch interface may be located in a cockpit of the aircraft, and the second switch interface may be located on at least one of a landing gear well or a landing gear of the aircraft.

A method of controlling a parking brake system is also provided. The method may include the steps of detecting a first enable switch of a first switch interface is engaged, detecting a first activate switch of the first switch interface is engaged while the first enable switch is engaged, and illuminating a light on a second switch interface in response to the first activate switch being engaged while the first enable switch is engaged. The first switch interface may be disposed at a first location, and the second switch interface may be disposed at a second location.

In various embodiments, the steps may include changing a parking brake between a park state and a not-park state in response to the first activate switch being engaged while the first enable switch is engaged. The light may illuminate in a pulse pattern. The first switch interface may be located in a cockpit and the second switch interface may be located elsewhere. The steps may also include receiving an engage signal from a virtual machine controller, receiving an activate signal from the virtual machine controller while the engage signal is active, and illuminating the light on the second switch interface in response to receiving the activate signal while the engage signal is active.

A parking brake system is further provided. The parking brake system may include a processor, and a tangible, non-transitory memory configured to communicate with the processor. The tangible, non-transitory memory may have instructions stored thereon that, in response to execution by the processor, cause the parking brake system to perform operations. The operations may include detecting a first enable switch of a first switch interface is engaged with the first switch interface being disposed at a first location. The system may also detect a first activate switch of the first switch interface is engaged while the first enable switch is engaged. The system may also change a parking brake between a park state and a not-park state in response to the first activate switch being engaged while the first enable switch is engaged.

In various embodiments, the operations may further comprise illuminating a light on a second switch interface in response to the first activate switch being engaged while the first enable switch is engaged, wherein the second switch interface is disposed at a second location. The first switch interface may be located in a cockpit and the second switch interface may be located outside the cockpit.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
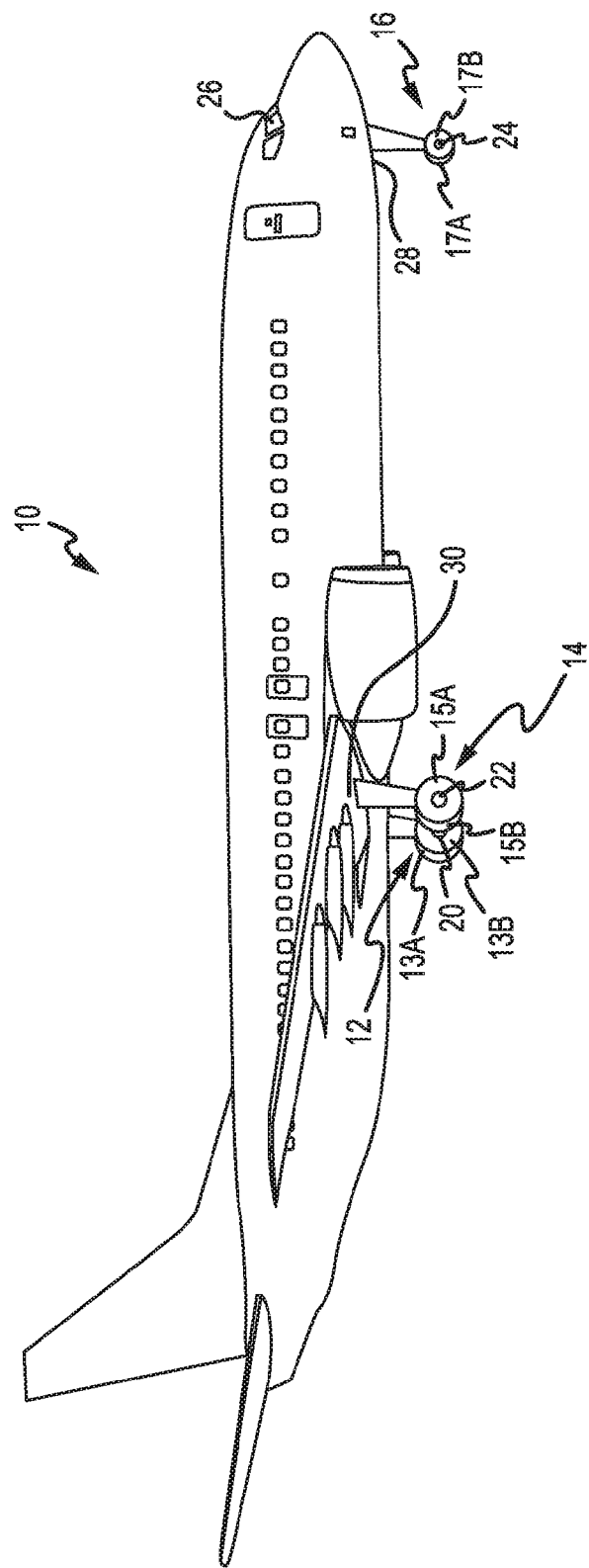
FIG. 1 illustrates an exemplary aircraft at rest with a parking brake applied, in accordance with various embodiments.

Referring now to FIG. 1, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24.

Figure 2:
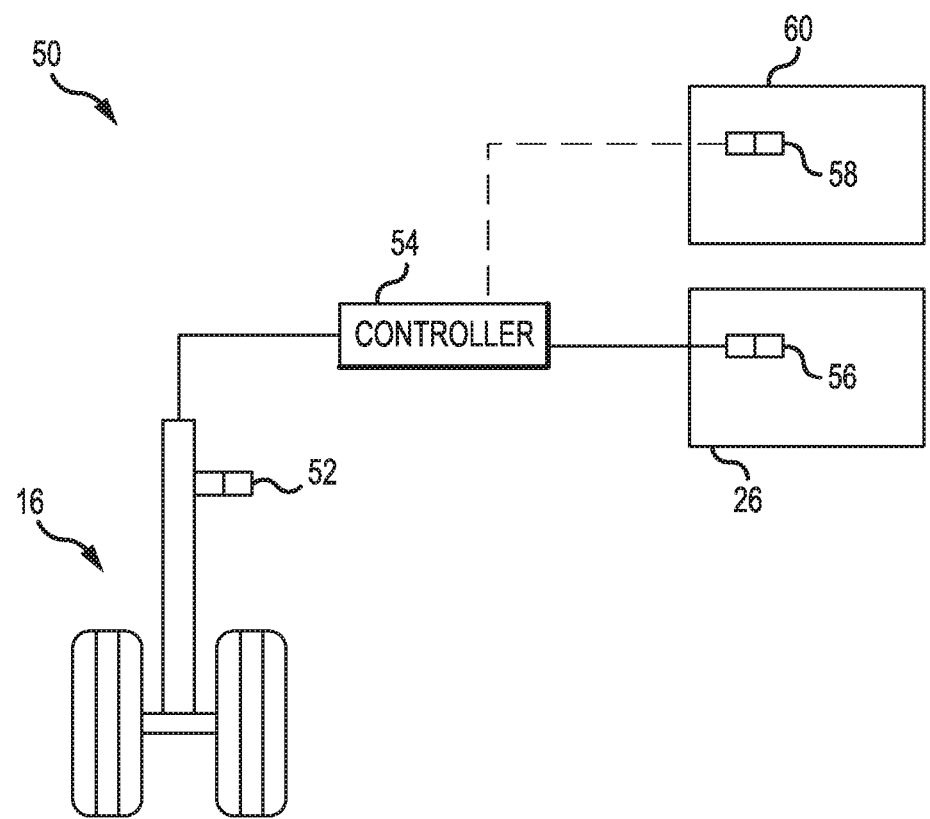
FIG. 2 illustrates an exemplary system for controlling a parking brake system on an aircraft, in accordance with various embodiments.

In various embodiments, main landing gear 12, main landing gear 14, and nose landing gear 16 may each be retracted for flight. Referring now to FIGS. 1 and 2, hydraulic systems, electric systems, and/or hybrid systems may be controlled by parking brake system 50. Parking brake system 50 may thus request application braking of braking force to one or more wheels of aircraft 10 on the main landing gear. The brakes may be engaged and disengaged for parking situations from various locations such as from a switch interface 56 located in a cockpit 26, a switch interface in nose wheel well 28, a switch interface in main wheel well 30, a switch interface 52 on nose landing gear 16, another switch location on aircraft 10, an autonomous onboard controller, a remote console, a virtual machine controller (VMC) 60 running emulated switch interface 58, or another suitable switching brake location. The various switch interfaces may be wired to controller 54 and/or in wireless communication with controller 54, for example, depending in part on the location of the switch relative to controller 54.

Controller 54 and/or VMC 60 may be computer systems onboard an aircraft such as a brake control unit (BCU), a full authority digital engine control (FADEC), and/or an engine-indicating and crew-alerting system (EICAS), for example. VMC 60 may be integrated into controller 54 and run on the same hardware as controller 54. VMC 60 may also run separately from controller 54 and be located elsewhere in aircraft 10 from FIG. 1 or remotely from aircraft 10 and in wireless communication with controller 54. Each controller may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, controller 54 and/or VMC 60 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the switch interfaces of system 50 may be in electronic communication with a controller 54, which is configured to process and send various signals to each switch and/or controller coupled to system 50. Controller 54 may thus arbitrate parking brake status and requests from switch interface 52, switch interface 56, and/or a switch interface located remotely relative to one another. For example, in response to users interacting with switch interface 52 and switch interface 56 concurrently, controller 54 may use LED or light indicators to communicate the status of the parking brakes and other switch interfaces on the aircraft.

Figure 3:
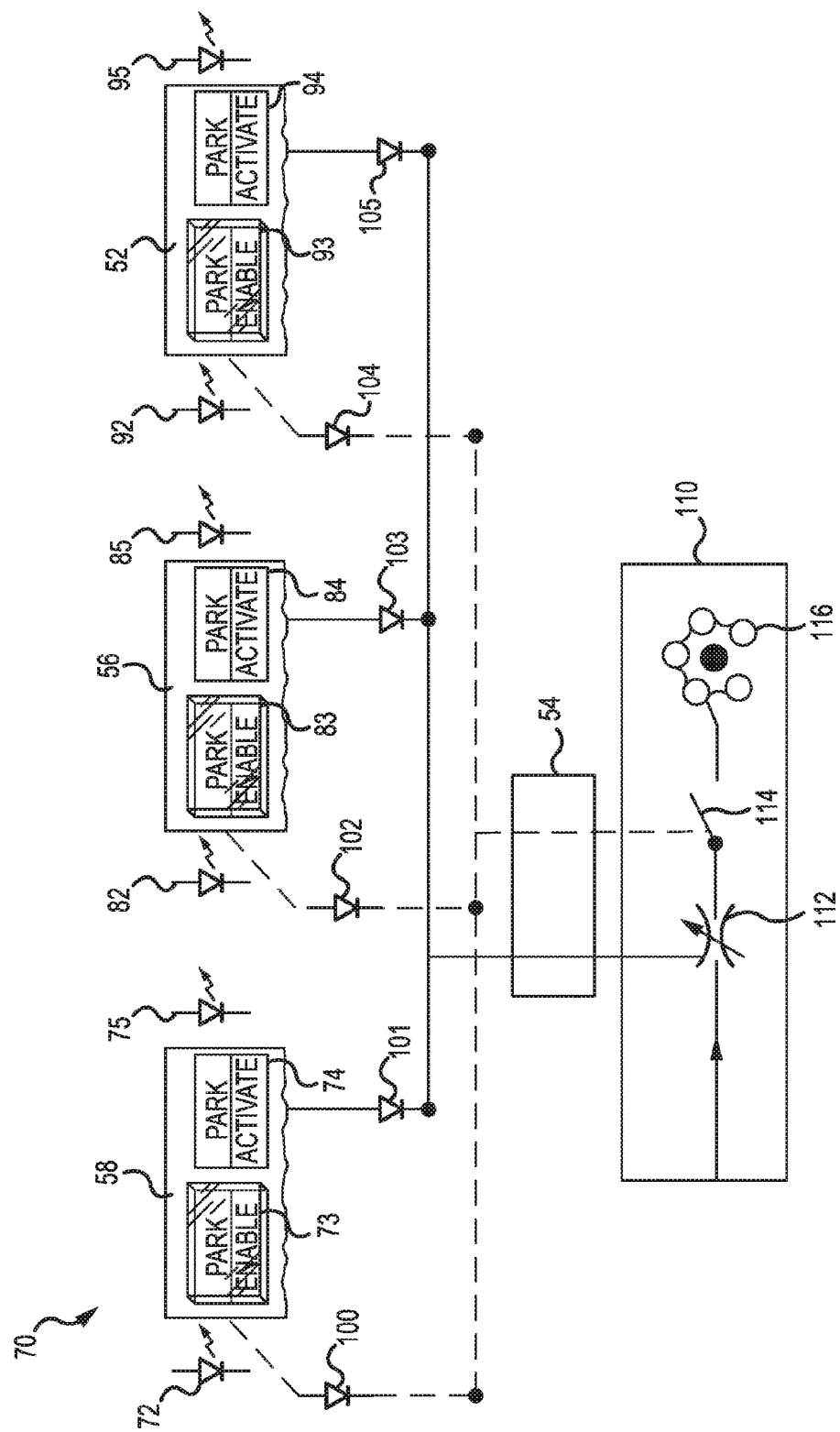
FIG. 3 illustrates a parking brake system for an aircraft having multiple control locations, in accordance with various embodiments.

Referring now to FIGS. 2 and 3, an exemplary parking brake system 70 is shown for engaging and disengaging a parking brake on aircraft 10 of FIG. 1 using two or more switch interfaces located at different locations, in accordance with various embodiments. Switch interface 58 comprises an "enable" switch 73 and an "activate" switch 74. The terms enable and activate are used as labels to describe switches with different functionality as described herein, and are not meant to limit the functionality of said switches to enabling or activating, respectively. Enable switch 73 may be coupled to controller 54 and/or shutoff valve (SOV) 114. The electrical signal leaving enable switch 73 may pass through diode 100 to limit the electrical signal to passing in one direction. Activate switch 74 may be coupled to controller 54 and/or servo 112. Servo 112 may act as a flow control to control the pressure of brake 116, but servo 112 may only alter the pressure in brake 116 when SOV 114 is configured to allow flow to pass. In that regard, SOV 114 may lock the hydraulic pressure, and thus braking force, based on the pressure of the hydraulic fluid in brake 116 in response to SOV 114 shutting off flow. SOV 114 and servo 112 are hydraulic components of brake system 110. Although brake system 110 is illustrated as a hydraulic system, brake system 110 may also be an electronic or hybrid system. The electrical signal leaving activate switch 74 may pass through diode 101 to limit the electrical signal to passing diode 101 in one direction. Other hydraulic components may be used in place of a servo to provide switching such as a proportional valve to allow control to variable pressure levels, or an on-off valve that opens to let maximum brake pressure to park an aircraft.

In various embodiments, enable switch 73 may include signal interface 72 configured to signal depression of enable switch 73. Similarly, activate switch 74 may include signal interface 75 configured to signal depression of activate switch 74. Signal interface 72 may also be configured to illuminate in response to depression of other switches and/or a command from controller 54 based on the status of parking brake system 70. Signal interface 72 and/or signal interface 75 may signal various conditions throughout parking brake system 70 as described in greater detail below.

Switch interface 56 comprises an "enable" switch 83 and an "activate" switch 84. Enable switch 83 may be coupled to controller 54 and/or SOV 114. The electrical signal leaving enable switch 83 may pass through diode 102 to limit the electrical signal to passing in one direction. Activate switch 84 may be coupled to controller 54 and/or servo 112. SOV 114 and servo 112 are hydraulic components of brake system 110. The electrical signal leaving activate switch 84 may pass through diode 103 to limit the electrical signal to passing diode 103 in one direction.

In various embodiments, enable switch 83 may include light 82 configured to signal depression of enable switch 83. A light may include an LED, incandescent light, or an indicator in a user interface. Similarly, activate switch 84 may include light 85 configured to signal depression of activate switch 84. Light 82 may also be configured to illuminate in response to depression of other switches and/or a command from controller 54 based on the status of parking brake system 70. Light 82 and/or light 85 may signal various conditions throughout parking brake system 70.

Switch interface 52 is similar to switch interface 56 and comprises several components including enable switch 93 and light 92, activate switch 94 and light 95, and diode 104 and diode 105. Each of the above components of switch interface 52 functions similarly to the depicted counterpart of switch interface 56. Although diodes are used throughout the above described exemplary system, other circuitry that that isolates the signals or creates a logical or between various switch interfaces may be used.

SOV 114 may be electrically excited in response to receiving a signal from an enable switch and may thus actuate the valve into a position that allows hydraulic fluid to pass through to brake 116. Parking brake system 70 may be powered by a battery, an aircraft power bus, a generator, or other electrical power sources. Parking brake system 70 may also remain inactive to conserve power until one or more switch is engaged. Parking brake system 70 may retain in non-volatile memory the last state of the parking brakes if remaining inactive to conserve power.

Figure 4:
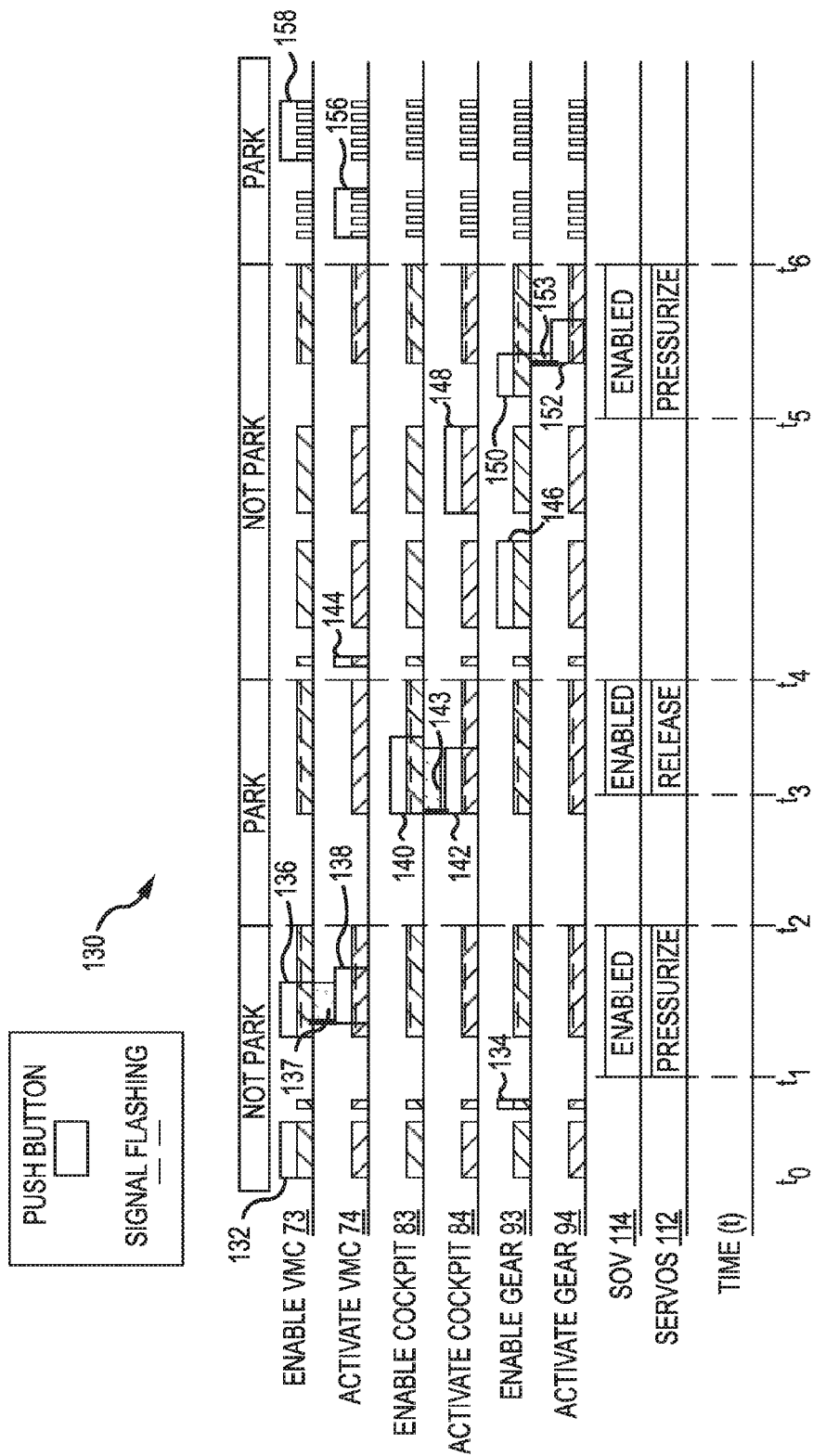
FIG. 4 illustrates an exemplary timeline of engaging and disengaging parking brake control switches, in accordance with various embodiments.

Referring now to FIGS. 2, 3, and 4, timeline 130 illustrates exemplary behavior of parking brake system 70 in response to various states of the switch interfaces of parking brake system 70, in accordance with various embodiments. The timeline of FIG. 4 illustrates the result of button depressions at various times with respect to pressure at servo 112 as well as the signal interfaces and/or lights of switch interface 58, switch interface 56, and switch interface 52.

The system may begin in the "not-park" state, indicating that the parking brake is not applied. VMC 60 sends enable switch 73 signal at engagement 132 without sending signal on activate switch 74 at time $T_0$. In response to the signal, each signal interface and/or light of parking brake system 70 may illuminate with a pattern indicating that an enable switch is engaged without an activate switch. A short time later, a user may depress enable switch 93 at engagement 134. Again, each signal interface and/or light of parking brake system 70 may illuminate with a pattern indicating that an enable switch is engaged without an activate switch. The illumination pattern may include irregular flashing, regular flashing, solid on, lingering after release, only a single light on, a subset of lights on, etc. The pattern may also be different when in "not-park" status or in "park" status when a single button is pressed. For example, lights may flash 5 times per second in response to a single switch being engaged when in "not-park," and remain solid in response to a single switch being engaged when in "park."

VMC 60 may later send an enable signal 136 from enable switch 73 to controller 54 and/or SOV 114. While enable switch 73 is still engaged, VMC 60 may send an activate signal 138 starting at $t_1$ with overlapping duration 137. Signal interfaces and/or lights at each switch interface may begin signaling in response to activate switch 74 being engaged while enable switch 73 is still engaged. The signal may indicate that the state of the parking brake is changing. For example, as illustrated, the signal flashes with a predetermined pattern for a predetermined duration lasting from $t_1$ until $t_2$. The signal indicates at different locations that the parking brake status is changing. There may be a signal to indicate the change is into a park status. There may also be a separate signal to indicate the change is into a not-park status. In various embodiments, the signal may also be the same for park and not-park changes as to simply indicate a change is occurring. In response to the enable switch 73 and activate switch 74 being engaged at the same time, SOV 114 is enabled and servo 112 pressurizes brake 116 to switch the parking brake system into a park status.

Later, at time $t_3$, a pilot may engage both enable switch 83 at engagement 140 and activate switch 84 at engagement 142 at the same time so that activate switch 84 is engaged while enable switch 83 is engaged for overlapping duration 143. SOV 114 may be enabled and servo 112 may release pressure from brake 116 to switch the parking brake system into the not-park state. Signal interfaces and/or lights at each switch interface may begin signaling in response to activate switch 84 being engaged while enable switch 83 is still engaged. The signal may indicate that the state of the parking brake is changing or has recently changed. The signal and/or the switch of parking brake status between park and not-park may be delayed for a brief predetermined period to allow users an opportunity to release the switch without changing status. For example, the system may switch states in response to the enable switch and engage switch at a switch interface being both engaged for a 1 second period. For example, as illustrated, the signal flashes with a predetermined pattern for a predetermined duration lasting from $t_3$ until $t_4$. The signal indicates at different locations that the parking brake status is changing. The signal for changing into not-park may vary from the signal changing into park by having a different duration, different flashing frequency, illuminating a different light color, or other signal variations suitable to lights and LEDs.

VMC 60 may send engage signal 144 on switch 74 to check brake status without sending an engage signal on enable switch 73. Signal interfaces and/or lights at one or more switch interfaces may begin signaling brake status in response to activate switch 74 being engaged. For example, the signal interface 75 at VMC 60 may be the only signal interface activated. Each signal interface and/or light at each switch interface may also be activated. Parking brake system 70 may behave similarly to engagement 146 of enable switch 93 and engagement 148 of activate switch 84. In that regard, the status of parking brake system 70 may be checked by engaging one of the activate switches or enable switch at a switch interface without engaging the other. The status may be signaled at the location of the engaged switch or at locations of all switch interfaces on the aircraft in response to the aircraft switching into the not-park state.

A ground crew member may check parking brake status by engaging enable switch 93 at engagement 150. The ground crew member may initiate a state switch at time $t_5$ by engaging activate switch 94 at engagement 152 while enable switch 93 is still engaged, resulting in a period of overlapping duration 153. A signal may be sent to all switch interfaces in response to both switches being engaged at the same time. The signal may last from $t_5$ to $t_6$ and may be identical to the signal sent from $t_1$ to $t_2$, for example. In response to the enable switch 93 and activate switch 94 being engaged at the same time, SOV 114 is enabled and servo 112 pressurizes brake 116 to switch the parking brake system into a park status. VMC 60 may subsequently check the status, sending an activate signal at engagement 156 and an enable signal at engagement 158. The park status of the brake system may be indicated with a different visual indicator than not park status. As shown in engagement 156 and engagement 158 by flashing light to indicate park, and in engagement 132 by a solid light to show not park. Various visual indicators may include varying flash periods, varying light colors (e.g., green for park, and red for not park), or other suitable visual cues.

Figure 5:
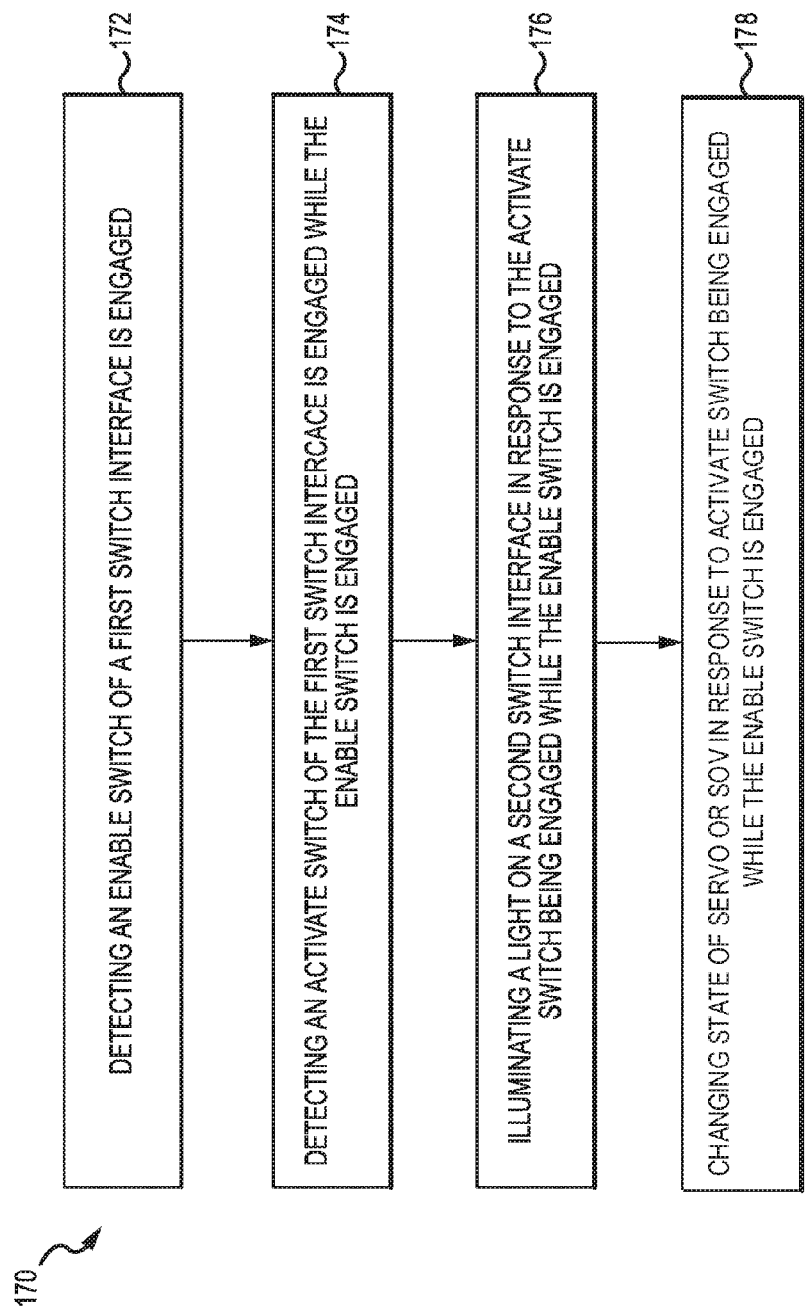
FIG. 5 illustrates an exemplary method of controlling an aircraft parking brake system with multiple control locations, in accordance with various embodiments.

Referring now to FIGS. 3 and 5, method 170 of controlling a parking brake system on an aircraft is shown, in accordance with various embodiments. Method 170 may be executed by controller 54, for example. Controller 54 may thus detect an enable switch 83 of switch interface 56 is engaged (Step 172). First switch interface 56 may be situated at a location of the aircraft such as, for example, a cockpit. Controller 54 may also detect an activate switch 84 of the first switch interface is engaged while the first enable switch 83 is engaged (Step 174). Controller 54 may illuminate a light on a second switch interface in response to the activate switch 84 being engaged while the enable switch 83 is engaged (Step 176). The second switch interface is disposed at a second location different from the first location. Controller 54 may also change the state of servo 112 or SOV 114 as described above in response to the activate switch 84 being engaged while the enable switch 83 is engaged (Step 178).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A parking brake system for an aircraft, comprising:
   a first switch interface at a first location comprising a first enable switch and a first activate switch, wherein the parking brake system is configured to switch a state of a brake in response to the first enable switch and the first activate switch being engaged at the same time; and
   a second switch interface at a second location comprising a second enable switch and a second activate switch, wherein the parking brake system is configured to switch the state of the brake in response to the second enable switch and the second activate switch being engaged simultaneously;
   wherein a shutoff valve is actuated to at least one of allow or disallow hydraulic fluid to flow through the brake in response to the first or second enable switch being engaged and wherein a servo is actuated to set a hydraulic fluid pressure of the brake in response to at least one of the first or second activate switch being engaged.

2. The system of claim 1, wherein the first switch interface further comprises a first light configured to illuminate in response to the first enable switch being engaged.

3. The system of claim 2, wherein the first light is configured to illuminate in a flashing pattern in response the state of the brake switching.

4. The system of claim 2, wherein the second switch interface further comprises a first light configured to illuminate in response to the first enable switch being engaged.

5. The system of claim 2, wherein the first switch interface further comprises a second light configured to illuminate in response to the first activate switch being engaged.

6. The system of claim 5, wherein the first light of the first switch interface is configured to illuminate a translucent surface of the first enable switch, and wherein the second light is configured to illuminate a translucent surface of the first activate switch.

7. The system of claim 2, further comprising a virtual machine controller (VMC) configured to change the state of the brake.

8. The system of claim 7, wherein the first light of the first switch interface is configured to illuminate in response to an engage signal transmitted by the VMC.

9. The system of claim 7, wherein the VMC is commanded remotely.

10. The system of claim 1, wherein the first switch interface is located in a cockpit of the aircraft, and the second switch interface is located on at least one of a landing gear well or a landing gear of the aircraft.

11. A method of controlling a parking brake system, comprising:
    detecting a first enable switch of a first switch interface is engaged, wherein the first switch interface is disposed at a first location;
    actuating a shutoff valve to at least one of allow or disallow hydraulic fluid to flow through the parking brake system in response to the first enable switch being engaged;
    detecting a first activate switch of the first switch interface is engaged while the first enable switch is engaged;
    actuating a servo to set a hydraulic fluid pressure in the brake system in response to the first activate switch being engaged;
    illuminating a light on a second switch interface in response to the first activate switch being engaged while the first enable switch is engaged, wherein the second switch interface is disposed at a second location.

12. The method of claim 11, further comprising changing a brake between a park state and a not-park state in response to the first activate switch being engaged while the first enable switch is engaged.

13. The method of claim 12, wherein the light is illuminated in a pulse pattern.

14. The method of claim 12, wherein the first switch interface is located in a cockpit and the second switch interface is located outside the cockpit.

15. The method of claim 12, further comprising:
    receiving an engage signal from a virtual machine controller;
    receiving an activate signal from the virtual machine controller while the engage signal is active; and
    illuminating the light on the second switch interface in response to receiving the activate signal while the engage signal is active.

16. A parking brake system, comprising:
    a processor;
    a tangible, non-transitory memory configured to communicate with the processor, the tangible, non-transitory memory having instructions stored thereon that, in response to execution by the processor, cause the parking brake system to perform operations comprising:
    detecting, by the parking brake system, a first enable switch of a first switch interface is engaged, wherein the first switch interface is disposed at a first location;
    actuating, in response to the first enable switch of the first switch interface being engaged, a shutoff valve to at least one of allow or disallow hydraulic fluid to flow into a brake;
    detecting, by the parking brake system, a first activate switch of the first switch interface is engaged while the first enable switch is engaged;
    actuating, in response to the first activate switch of the first switch interface being engaged, a servo to set a hydraulic fluid pressure of the brake;
    changing, by the parking brake system, the brake between a park state and a not-park state in response to the first activate switch being engaged while the first enable switch is engaged.

17. The parking brake system of claim 16, wherein the operations further comprise illuminating a light on a second switch interface in response to the first activate switch being engaged while the first enable switch is engaged, wherein the second switch interface is disposed at a second location.

18. The parking brake system of claim 17, wherein the first switch interface is located in a cockpit and the second switch interface is located outside the cockpit.

* * * * *